United States Patent [19]

Sawano

[11] Patent Number: 5,786,900
[45] Date of Patent: Jul. 28, 1998

[54] IMAGE RECORDING DEVICE FOR RECORDING MULTICOLOR IMAGES WITH DOT PITCH PATTERN RANDOMLY ARRANGED ONLY IN THE SUB-SCANNING DIRECTION

[75] Inventor: Mitsuru Sawano, Shizuoka-ken, Japan

[73] Assignee: Fuji Photo Film Co., Ltd., Kanagawa, Japan

[21] Appl. No.: 390,797

[22] Filed: Feb. 17, 1995

[30] Foreign Application Priority Data

Mar. 23, 1994 [JP] Japan .................... 6-052113

[51] Int. Cl.⁶ .................... H04N 1/40; H04N 1/46
[52] U.S. Cl. .................... 358/298; 358/533
[58] Field of Search .................... 358/298, 448, 358/454, 518, 520, 521, 523, 530, 533–536; 382/162, 167

[56] References Cited

U.S. PATENT DOCUMENTS

| | | | |
|---|---|---|---|
| 4,958,218 | 9/1990 | Katayama et al. | 358/530 |
| 5,297,878 | 3/1994 | Saito et al. | 400/120 |
| 5,394,252 | 2/1995 | Holladay et al. | 358/533 |
| 5,469,266 | 11/1995 | Usami et al. | 358/298 |
| 5,494,361 | 2/1996 | Sonoda | 400/120.07 |
| 5,548,407 | 8/1996 | von Kienlin et al. | 358/298 |

FOREIGN PATENT DOCUMENTS

| | | |
|---|---|---|
| 453756 | 2/1992 | Japan . |
| 5155057 | 6/1993 | Japan .................. B41J 2/355 |
| 6206328 | 7/1994 | Japan . |

OTHER PUBLICATIONS

Y. Sonoda et al., "The Effects of a Pixel Layout on the Quality of Halftone Images Produced by Louver". 9th Int'l Congress on Advances in Non–Impact Printing Tech.. Jp. Hardcopy '93, pp. 342-345.

*Primary Examiner*—Eric Frahm
*Attorney, Agent, or Firm*—Sughrue, Mion, Zinn, Macpeak & Seas, PLLC

[57] ABSTRACT

An image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black are combined so as to record multicolor images, the method including the step of: recording the respective colors in a pattern in which a dot pitch was randomly arranged only in the sub-scanning direction. Further, recording a color in a pattern in which a dot pitch was ordinarily arranged in the sub-scanning direction, and recording the other colors in a pattern, in which the dot pitch was randomly arranged only in the sub-scanning direction, could also be performed. The length of pixel of at least two colors in the sub-scanning direction, can be set to a different non-integer multiple with respect to the corresponding length of pixel of one other color (such as yellow), reducing color moire and graininess.

4 Claims, 12 Drawing Sheets

F I G. 4
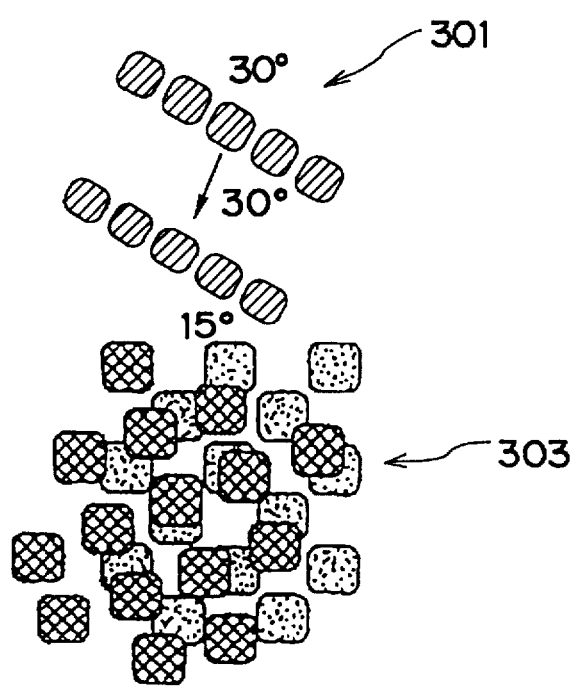

ORDINARILY ARRANGED
PATTERN

RANDOMLY ARRANGED
PATTERN

2/3 ARRANGED PATTERN

1/2 ARRANGED PATTERN

Y: ORDINARILY ARRANGED PATTERN *

M: 3/4 ARRANGED PATTERN

C: 3/5 ARRANGED PATTERN *

K: 1/2 ARRANGED PATTERN

*: RESOLUTION IN MAIN SCANNING REDUCTION MAY BE REDUCED

IMAGE RECORDING DEVICE FOR RECORDING MULTICOLOR IMAGES WITH DOT PITCH PATTERN RANDOMLY ARRANGED ONLY IN THE SUB-SCANNING DIRECTION

BACKGROUND OF THE INVENTION

1. Field of the Invention

The present invention relates to an image recording method in which multicolor, multi-gradation expression is allowed by varying dot lengths.

2. Description of the Related Art

As a means of obtaining a multicolor, multi-gradation recording, a dot gradation expression, for example, can be suggested in which the respective dot areas are varied in accordance with gradations so as to express desired gradations. In this case, in order to correspond to the multicolor recording, the dots of respective colors having the same shape are superposed and recorded. However, deviation in registration may occur every recording and thereby generating a color moire.

The above-described color moire can be prevented by improving the precision of machinery. However, it is technologically difficult to improve the precision. Therefore, in the field of offset printing or the like, the color moire has been prevented by changing the angles of dots of respective colors. Namely, instead of arranging the dots grid-like and regularly, the angles at which the dots are arranged (dot arrangement angles) are changed to, for example, 15°, 30°, 45°, , or 75° with respect to the main scanning direction.

Alternatively, a so-called FM screening, in which dots of a predetermined size are randomly arranged in accordance with gradations, are used so that the color moire is suppressed by random dots of the respective colors which do not have directions.

The above-described respective means can effectively suppress the occurrence of color moire in a case in which the resolution in the main scanning direction and the resolution in the sub-scanning direction are set smaller than the unit of a pixel. However, when the resolution in the main scanning direction is a line head such as a thermal head, a liquid crystal head, an LED (light emitting diode) head, or an EL (electroluminescence) head, which are specified by the size of a recording element and are substantially set to the unit of a pixel, the degrees of freedom in changing the arrangement of dots is limited to the sub-scanning direction. Accordingly, the moire stripes cannot be effectively suppressed.

In order to solve the above circumstances, a color image recording method which is disclosed in Japanese Patent Application Laid-Open No. 5-155057 has been proposed. Namely, in order to prevent the respective pixels of three primary colors from being arranged in the main scanning direction, the pixels are shifted a substantially half pitch in the sub-scanning direction. At the same time, the pixel density of one of the three primary colors is halved in the sub-scanning direction. Consequently, even if the deviation in registration occurs, the color pattern of the adjacent two columns are maintained in a complementary chromatic relationship. Accordingly, overall tone does not change, and irregularities in color are not conspicuous.

As described above, various means have been proposed to prevent color moire when a multicolor, multi-gradation recording is effected.

However, even if the multicolor, multi-gradation expression is effected by changing the dot arrangement angles, the occurrence of color moire called a Rosetta pattern, which causes graininess, cannot be prevented.

Moreover, according to the color image recording method disclosed in Japanese Patent Application Laid-Open No. 5-155057, in the case of three colors, the color moire can be effectively suppressed even if the resolution in the main scanning direction is limited. However, the color moire cannot be prevented in the case of multicolor, multi-gradation recording by a four-color separation, which is widely used in printing.

SUMMARY OF THE INVENTION

The present invention was developed in light of the above circumstances, and the object thereof is to provide an image recording method which can effectively suppress the color moire in the case in which the resolution in the main scanning direction is structurally fixed.

A first aspect of the present invention is an image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, the method comprising the step of: recording the respective colors in a pattern in which a sub-scanning direction dot pitch was randomly arranged in the sub-scanning direction.

A second aspect of the present invention is an image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, the method comprising the step of: recording one color in a pattern in which a sub-scanning direction dot pitch was ordinarily arranged, and recording the other colors in a pattern in which the sub-scanning direction dot pitch was randomly arranged in the sub-scanning direction.

A third aspect of the present invention is an image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, the method comprising the step of: recording one color in an ordinarily arranged pattern, and recording at least two colors in patterns in which each dot pitch in a longitudinal direction in the sub-scanning direction, is set to a different non-integer with respect to the one color.

A fourth aspect of the present invention is an image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, the method comprising the step of: recording yellow in a pattern which was randomly arranged in the sub-scanning direction, and recording magenta, cyan and black in patterns in which each dot pitch in a longitudinal direction in the sub-scanning direction, is set to a non-integer different from one another.

In addition, in the image recording by the head in which the plurality of recording elements are arranged a predetermined pitch, the dots, whose longitudinal direction pitch is in the sub-scanning direction, are reduced by desired magnification. Accordingly, the arranged pattern having desired resolution in the sub-scanning direction is formed. As a result, the resolution in the sub-scanning direction is varied and the color moire is thereby reduced.

Regarding the magnification set in the sub-scanning direction, the requisite magnifications are set every respective colors. One color is recorded in a regularly arranged pattern in which the magnification is set to 1, and the other colors are recorded in patterns in which each magnification is set to a non-integer with respect to the above-described one color.

Namely, when four-color separated images are formed, for example, Y is recorded in a regularly arranged pattern, and M, C and K are recorded in patterns in which each magnification is set to a non-integer. In this case, the ratio of magnification of the respective colors is set as follows: Y:M:C:K=1:s:t:u (s, t, u are non-integers).

Moreover, even if at least one color is recorded in a pattern which is arranged at random in the sub-scanning direction, the color moire is suppressed.

Further, even if one color is recorded in an ordinarily arranged pattern and the rest of the other colors are recorded in randomly arranged patterns, the color moire is suppressed. Here, there is a case in which the one color and the other colors are formed by a single color and a case in which the one color and the other colors are formed by a plurality of colors.

In particular, when yellow is recorded in a pattern arranged at random and magenta, cyan and black are recorded in patterns in which each magnification is set to a different non-integer, the color moire is preferably suppressed.

BRIEF DESCRIPTION OF THE DRAWINGS

FIG. 4 is a pattern diagram which illustrates a third embodiment of the present invention.

DESCRIPTION OF THE PREFERRED EMBODIMENTS

An embodiment of the present invention will be described hereinafter with reference to the drawings.

Figure 1A:
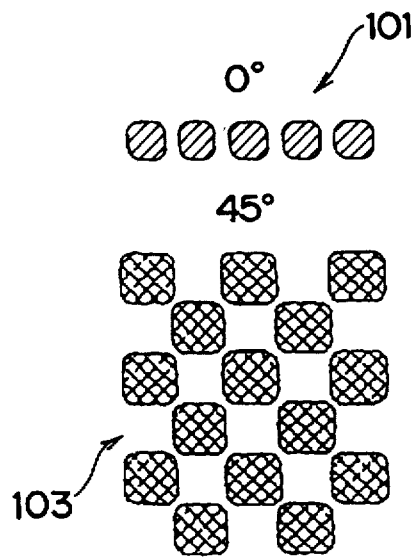
FIG. 1A is a pattern diagram which illustrates a first embodiment of the present invention.
Figure 1B:
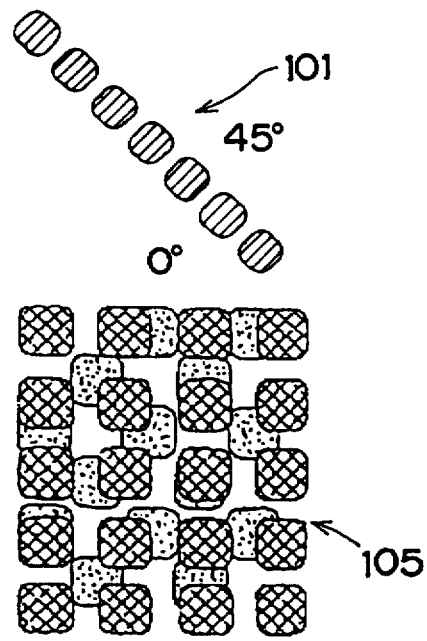
FIG. 1B is a pattern diagram which illustrates a first embodiment of the present invention.
Figure 1C:
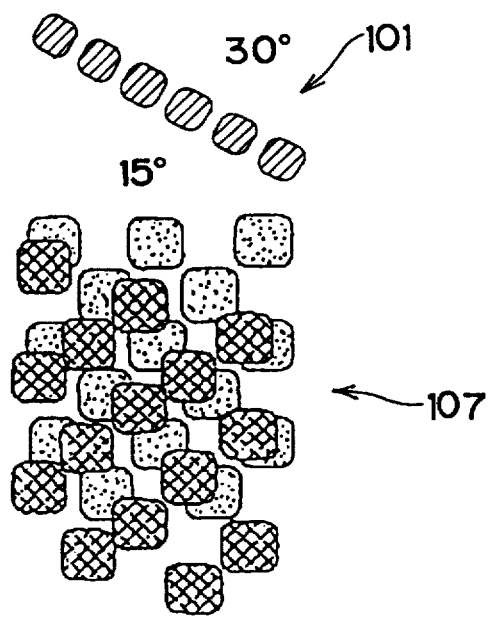
FIG. 1C is a pattern diagram which illustrates a first embodiment of the present invention.

FIGS. 1A through 1C show a first embodiment of the present invention. FIG. 1A shows, as a comparative example, a pattern 103 recorded at a dot arrangement angle of 45° by a conventional means which conveys in the sub-scanning direction a head 101, which is arranged at a dot pitch of 85 μm in the main scanning direction.

In contrast to this, FIG. 1B shows a pattern 105 which was recorded at an angle at which the dots are inclined (dot inclination angle) of 0° by conveying in the sub-scanning direction the inclined head 101, which has an angle of 45° with respect to the main scanning direction (a dark region of dots in FIG. 1B).

Here, compared to the pattern which was recorded by the conventional means and is shown in a light region of dots in FIG. 1B, the pitch in the main scanning direction of the recorded pattern 105 which uses the head 101, which is inclined and has an angle of 45° with respect to the main scanning direction, is found to be wider than the pitch in the main scanning direction of the recorded pattern by the conventional means which uses the head arranged in the main scanning direction.

Further, FIG. 1C shows a pattern 107 which was recorded at a dot inclination angle of 15° by conveying in the sub-scanning direction the head 101, which is inclined and has an angle of 30° with respect to the main scanning direction (a dark region of dots in FIG. 1C).

Here, compared to the pattern which was recorded by the conventional means and is shown in a light region of dots in FIG. 1C, the pitch in the main scanning direction of the recorded pattern 107 which uses the head 101, which is inclined and has an angle of 30° with respect to the main scanning direction, is found to be narrower than the pitch in the main scanning direction of the recorded pattern by the conventional means which uses the head arranged in the main scanning direction.

Figure 2:
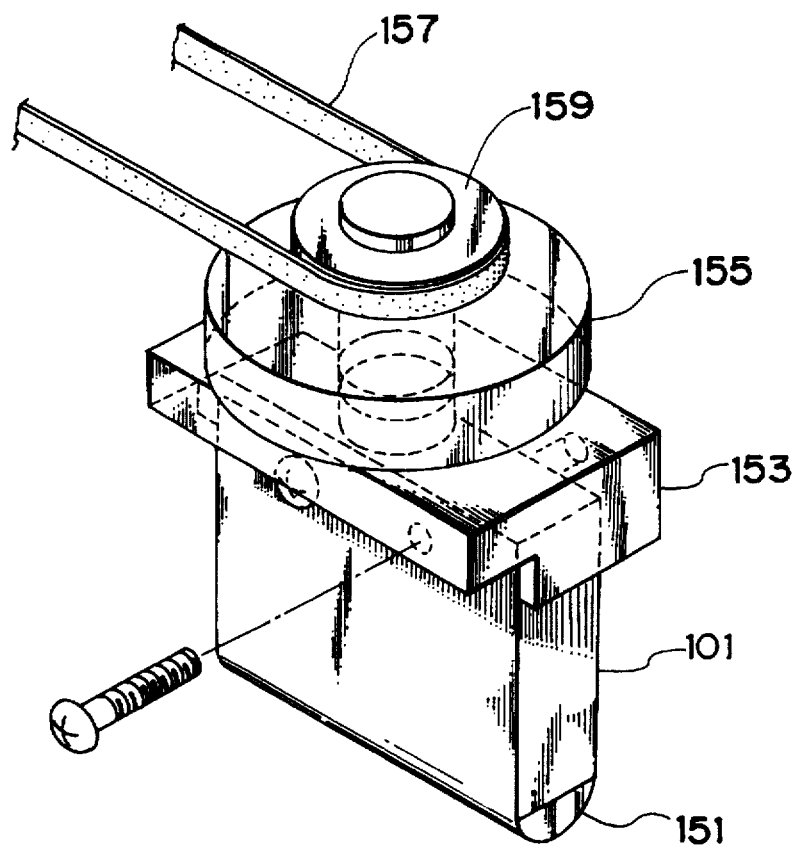
FIG. 2 is a schematic perspective view which illustrates a head shown in FIGS. 1A through 1C.

FIG. 2 shows a schematic perspective view of a system which inclines the head 101 at a requisite angle with respect to the main scanning direction. The head 101 having a heater column 151 at the end is supported by a holder 153, which is axially supported by a bearing 155. A pulley 159, around which a belt 157 is trained, is provided at the axial end which penetrates through the bearing 155. The head 101 is inclined at a requisite angle with respect to the main scanning direction by the belt drive of an unillustrated motor.

Figure 3A:
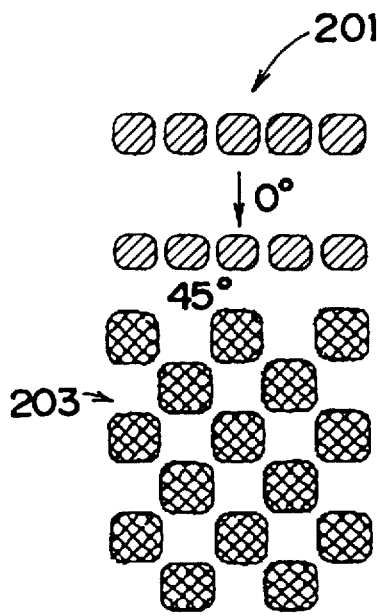
FIG. 3A is a pattern diagram which illustrates a second embodiment of the present invention.
Figure 3B:
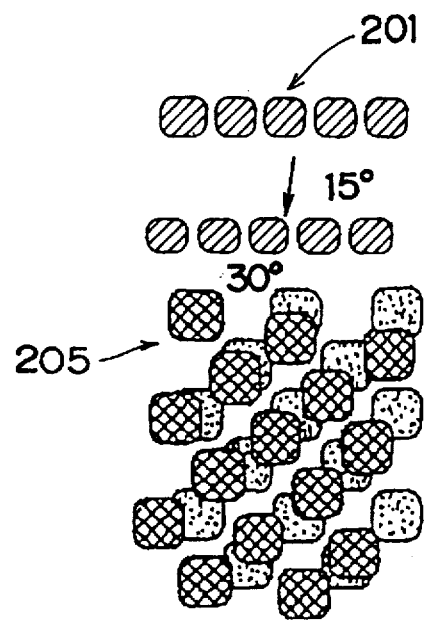
FIG. 3B is a pattern diagram which illustrates a second embodiment of the present invention.
Figure 3C:
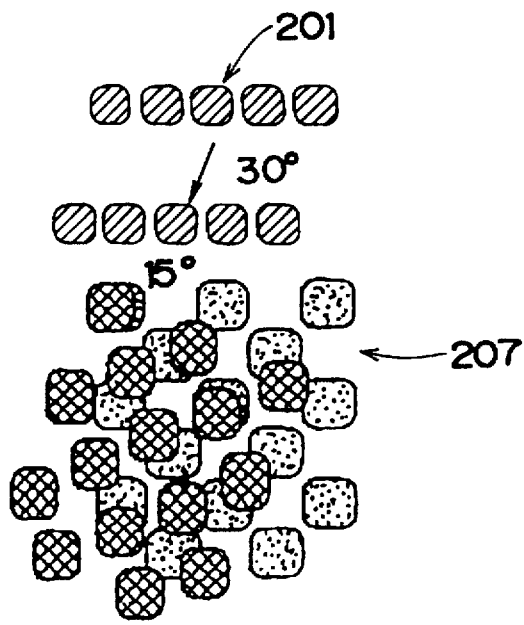
FIG. 3C is a pattern diagram which illustrates a second embodiment of the present invention.

FIGS. 3A through 3C show a second embodiment of the present invention. FIG. 3A shows, as a comparative example, a pattern 203 which was recorded at a dot arrangement angle of 45° by a conventional means which conveys in the sub-scanning direction a head 201, which was arranged in the main scanning direction.

In contrast to this, FIG. 3B shows a pattern 205 which was recorded at a dot inclination angle of 30° by conveying the head 201, which was arranged in the main scanning direction, at an angle of 15° with respect to the sub-scanning direction (a dark region of dots in FIG. 3B).

Here, compared to the pattern which was recorded by the conventional means and is shown in a light region of dots in FIG. 3B, the pitch in the main scanning direction of the recorded pattern 205 which uses the head 201, which is conveyed at an angle of 15° with respect to the sub-scanning direction, is found to be narrower than the pitch in the main scanning direction of the recorded pattern by the conventional means which uses the head conveyed in the sub-scanning direction.

Further, FIG. 3C shows a pattern 207 which was recorded at a dot inclination angle of 15° by conveying the head 201, which was arranged in the main scanning direction, at an angle of 30° with respect to the sub-scanning direction (a dark region of dots in FIG. 3C).

Here, compared to the pattern which was recorded by the conventional means and is shown in a light region of dots in FIG. 3C, the pitch in the main scanning direction of the recorded pattern 207 which uses the head 201, which is conveyed at an angle of 30° with respect to the sub-scanning direction, is found to be even narrower than the pitch in the main scanning direction of the recorded pattern by the conventional means which uses the head conveyed in the sub-scanning direction. Moreover, the respective dot areas are reduced.

The reduction in the respective dot areas of the recorded pattern is compensated by the following means.

FIG. 4 shows a third embodiment which is obtained by combining the first and second embodiments. Namely, FIG. 4 shows a pattern 303 which was recorded at a dot inclination angle of 15° by conveying at an angle of 30° with respect to the sub-scanning direction a head 301, which is inclined and has an angle of 30° with respect to the main scanning direction (a dark region of dots in FIG. 4).

Here, compared to the pattern which was recorded by the conventional means in FIG. 3A and is shown in a light region of dots in FIG. 4, the pitch in the main scanning direction of the recorded pattern 303 which uses the head 301, which is conveyed at an angle of 30° with respect to the sub-scanning direction and is inclined at an angle of 15° with respect to the main scanning direction, is found to be narrower than the pitch in the main scanning direction of the recorded pattern by the conventional means which uses the head arranged in the main scanning direction. Moreover, the respective dot areas are not reduced.

In accordance with the above-described first through third embodiments, even if the resolution in the main scanning direction is defined by the pitch arranged by the head, the resolution in the main scanning direction can be varied by inclining and/or diagonally moving the head. Accordingly, by varying the resolution in the main scanning direction and the conveying pitch, the degrees of freedom in changing the arrangement of the recorded dots are secured in two dimensions.

When recording is effected in accordance with the above-described embodiments, the graininess similar to that of printing is observed. Therefore, the recording is suitable for calibration or the like.

Description was given hereinbefore about the case in which the resolution in the main scanning direction is varied. Description will be given hereinafter about the case in which the resolution in the sub-scanning direction is varied.

FIGS. 5A through 5D show a fourth embodiment of the present invention. FIGS. 5A through 5D illustrate recording patterns which are used for the respective colors in the case in which multicolor, multi-gradation recording is effected by the four-color separation of yellow (Y), magenta (M), cyan (C) and black (K).

Figure 5A:
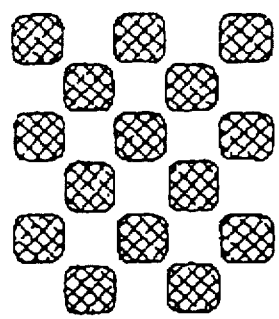
FIG. 5A is a pattern diagram which illustrates a fourth embodiment of the present invention.
Figure 5B:
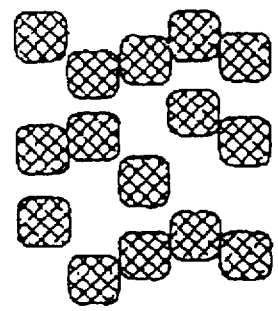
FIG. 5B is a pattern diagram which illustrates a fourth embodiment of the present invention.
Figure 5C:
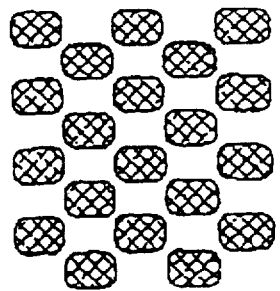
FIG. 5C is a pattern diagram which illustrates a fourth embodiment of the present invention.
Figure 5D:
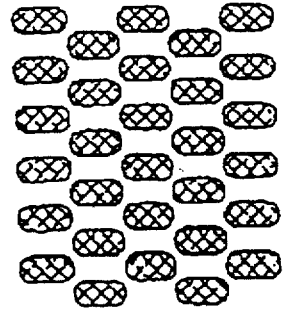
FIG. 5D is a pattern diagram which illustrates a fourth embodiment of the present invention.

Namely, as a comparative example, FIG. 5A shows an ordinarily arranged pattern in which the respective dots are regularly arranged. FIG. 5B shows a randomly arranged pattern in which the respective dots are arranged at random in the sub-scanning direction. FIG. 5C shows a ⅔ arranged pattern in which the respective dots, whose longitudinal directions run along the sub-scanning direction, are reduced by two thirds and are arranged regularly. FIG. 5D shows a ½ arranged pattern in which the respective dots, whose longitudinal directions run along the sub-scanning direction, are reduced by half and are arranged regularly.

Further, similarly to FIGS. 5C and 5D, an arranged pattern having desired resolution in the sub-scanning direction can be formed by reducing the dots, whose longitudinal directions run along the sub-scanning direction, by a desired magnification.

Description will be given hereinafter about visual evaluations of color moire and graininess, when gray solid images were recorded in which the resolution in the main scanning direction is 300 dpi, the resolution in the sub-scanning direction is 6600 dpi (3.7 µm conveyed) and the rate of recorded area is 50%. Here, the respective arranged patterns shown in FIGS. 5A through 5D were used in the respective colors of Y, M, C and K. Also, a line thermal head was used in which the resolution in the main scanning direction is 300 dpi, and which has a heater size in which the length in the main scanning direction is 70 µm and the length in the sub-scanning direction is 55 µm.

During the evaluations, deviation in registration between the respective colors was generated and then recorded so as to easily observe the color moire. The recording materials used in the evaluations are color materials (Y, M, C and K) which were used in the thermally-sensitive transfer recording materials.

Namely, 0.24 g of amide stearate and 60 g of n-PrOH were added to 10 g of dispersion solutions of four types which respectively include the following color materials A through D so as to form four types of application solutions. The application solutions were respectively applied to the polyester film (manufactured by Teijin Ltd.), which back surface is peeled and which has a thickness of 5 µm, so that the thickness of dry thin films having color materials A through D were 0.36 µm, 0.38 µm, 0.42 µm and 0.40 µm, respectively. Accordingly, the thermally-sensitive transfer materials were prepared.

A: cyan pigment (CI. P. B. 15:4) 12 g

B: magenta pigment (CI. P. R. 57:1)—12

C: yellow pigment (CI. P. Y 14)—12 g

D: carbon ("MA-100" manufactured by Mitsubishi Kasei Corp.) 12 g butyral resin ("Esrek FPD-1" manufactured by Sekisui Chemical Co. Ltd.; softening point is 70° C.; average degree of polymerization is less than or equal to 300) 12.0 g solvent n-propyl alcohol (n-PrOH) 110.4 g
dispersion aid "Solspas S-20000"
(manufactured by 1CI Japan Ltd.) 0.8 g

TABLE 1

| | Y | M | C | K | Color Moire | Grain- iness | Note |
|---|---|---|---|---|---|---|---|
| E1 | or | 1/2 | or | 2/3 | Δ | ○ | |
| E2 | 3/4 | 1/2 | or | 2/3 | ○ | ○ | |
| E3 | 1/2 | 0.886 times | or | 0.259 times | ○ | ○ | sin30°, 60°, 75°, 15° |
| E4 | ra | ra | ra | ra | ○ | X | |
| E5 | ra | ra | ra | or | ○ | Δ | |
| E6 | ra | 1/2 | or | 2/3 | ○ | ○ | |
| E7 | 1/2 | ra | or | 2/3 | ○ | Δ | |
| E8 | or | 3/4 | 3/5 | 1/2 | ○ | ○ | |
| E9 | de | de | de | 1/2 | ○ | ○ | good deep black |
| C1 | or | or | or | or | X | ○ | |
| C2 | or | or | or | — | Δ | ○ | 3 colors |
| C3 | or | 1/2 | or | — | ○ | ○ | 3 colors |
| C4 | or | 1/2 | or | 1/2 | X | ○ | |
| C5 | or | or | or | 1/2 | X | ○ | |
| C6 | de | de | de | de | ○ | ○ | blurred black |

Legends:
E . . . Embodiment
C . . . Comparative Example
or . . . ordinary arrangement
ra . . . random arrangement
de . . . dense
— . . . none
○ . . . usable
Δ . . . usable depending on the application
X . . . outside of the permissible range As shown in Table 1, when magnification of the cycle at which the dots are arranged (dot arrangement cycle) in the sub-scanning direction was set to a non-integer (1: non-integer) with respect to the other color, the color moire was reduced. Especially when the magnification of K was set to a non-integer with respect to the other color, the color moire was further reduced (see Embodiments 1 and 2).

In addition, when a randomly arranged pattern was used, the color moire was decreased and the graininess was increased (see Embodiment 4). Here, when the randomly arranged pattern was used for Y, which graininess is not conspicuous, both the color moire and the graininess were reduced (see Embodiment 6).

Here, Embodiment 3 shows dot angles of the conventional prints in which the dot arrangement cycles of Y, M, C and K in the sub-scanning direction were respectively set to sin 30°, sin 60°, sin 90° and sin 10°.

From the above evaluations, when three colors were separated and recorded, substantially satisfactory evaluations were obtained from all of the embodiments. However, when four colors were separated and recorded, satisfactory evaluations were obtained from Embodiment 6, in which a randomly arranged pattern was used, and Embodiment 8, in which the arranged patterns of Y, M, C and K were respectively set to an ordinarily arranged pattern, a ¾ arranged pattern, a ⅗ arranged pattern and a ½ arranged pattern.

Namely, among Embodiments 6 and 8 in which satisfactory evaluations were obtained, when the dot arrangement cycle in the sub-scanning direction set in Embodiment 8, which does not use a randomly arranged pattern, is analyzed, the ratio of dots of Y:M:C:K, whose longitudinal directions run along the sub-scanning direction, is set to 20:15:12:10. The ratio indicates the minimum cycle of the dot arrangement cycles in the sub-scanning direction. As was previously mentioned, satisfactory evaluations were obtained from Embodiment 8, in which Y is set to 1 and; on the basis of this value, the other colors are set to the above-described ratio.

Figure 6:
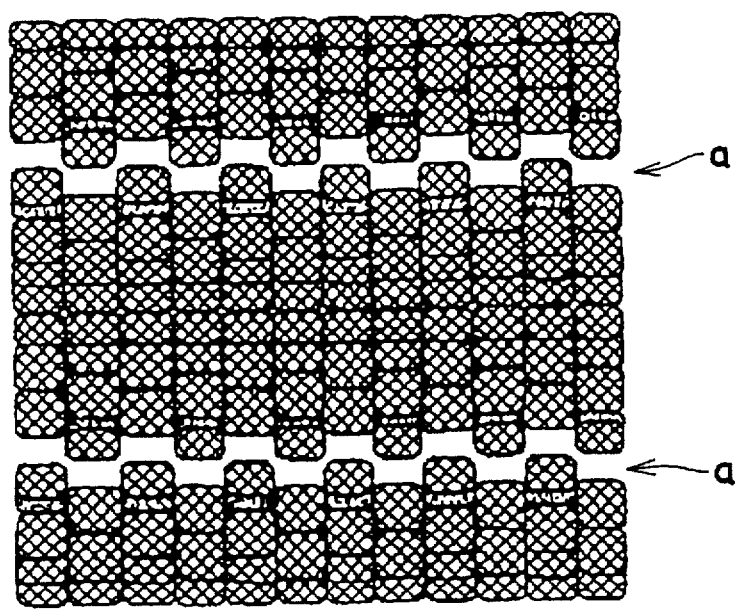
FIG. 6 is a pattern diagram which illustrates horizontal line moire.

Embodiment 8 shows a ratio in which the color moire can be suppressed to a minimum. As shown in FIG. 6, depending on the images, there is a case in which moire "a" having a horizontal line occurs as moire cycles correspond with each other.

Figure 7:
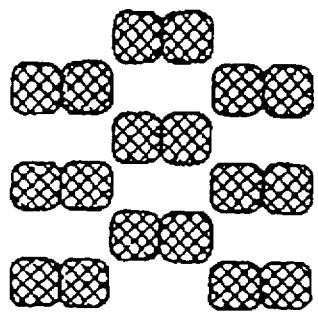
FIG. 7 is a pattern diagram for preventing the horizontal line moire shown in FIG. 6.
Figure 7:
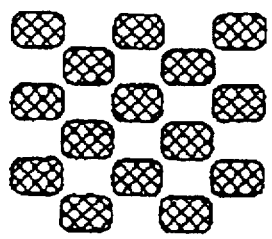
Figure 7:
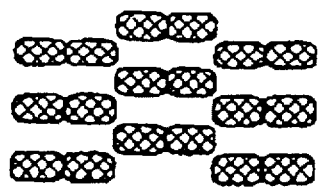
Figure 7:
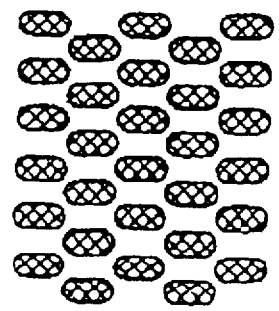

Therefore, as shown in FIG. 7, regarding Y and C, which have the ratio of dots, whose longitudinal directions run along the sub-scanning direction, as described in Embodiment 8, the dots of Y and C, whose transverse directions run along the main scanning direction, are doubled. The arranged pattern is used in which the resolution in the main scanning direction is reduced by half.

Figure 8:
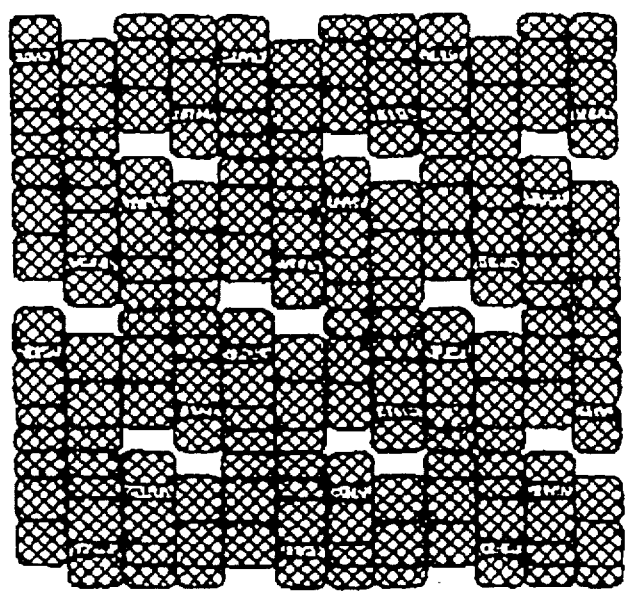
FIG. 8 is a pattern diagram when the patterns of respective colors shown in FIG. 7 are superposed.

FIG. 8 shows a state in which patterns which correspond to the respective colors shown in FIG. 7 are superposed. As illustrated in FIG. 8, the moire cycles are dispersed by combining the arranged patterns in which the resolutions in the main scanning direction are reduced. Accordingly, the above-described horizontal line moire is prevented.

The above-described arranged pattern can be used for one, two, or three colors of the four. Besides reducing the resolution in the main scanning direction by half, the resolution may be set by the unit of dot such as one thirds or quarter. The resolutions are effective to each case. These conditions are set according to the recording images. When the resolution in the main scanning direction is reduced, two adjacent dots in the main scanning direction may be controlled to separate sizes according to its own data. Namely, the resolution in shape is lowered and the resolution in data is not lowered. Moreover, in the present embodiment, the adjacent two dots are completely in parallel in the main scanning direction. However, the respective dots may be arranged so that they are slightly shifted in the sub-scanning direction.

Regardless of the recording based on the thermally-sensitive transfer material, the recording means which can prevent the above-described horizontal line moire can be applied to various kinds of multicolor image recordings such as a well-known fusing thermal transfer, a sublimated thermal transfer, a color thermally-sensitive ("Thermo Auto Chrome Paper FJX-TV P-20" manufactured by Fuji Photo Film Co., Ltd.), an ink jet recording, an electrophotographic recording, a color offset printing and a lith film for a color offset printing or the like. The recording means is particularly suitable for the recording which uses the area gradation.

Even if the sublimated transfer material is used and the area gradation is applied to the respective colors, the color moire and the graininess were reduced (see Comparative Example 6). Further, when a ½ arranged pattern is used only for K, the contour of black letters became sharp compared to the Comparative Example 6 (See Embodiment 9). In the sublimated thermal transfer materials which were used, "Sublimated Four Color A3 Super Ink Sheet CH-791" manufactured by Seiko Instruments Inc. was used as ink, and "Sublimated A3 Plain Paper CH-895" manufactured by Seiko Instruments Inc. was used as paper.

Further, in a case in which the recording was effected in accordance with the above-described fourth embodiment, causes of graininess such as Rosetta pattern which is observed at the time of printing are scarce. Consequently, the photographic images which are less grainy can be obtained particularly in the case of gray solid images or the like.

The above-described first through fourth embodiments are applicable to a direct color thermally-sensitive recording, a fusing transfer thermally-sensitive recording, and a sublimated transfer thermally-sensitive recording which are respectively recorded by thermal heads. In addition, the embodiments are applicable to electrophotography, silver photography and photopolymer multicolor photosensitive material which are recorded by liquid crystal alley line heads. Moreover, the embodiments are applicable to electrophotography and silver photography which are recorded by an LED line head or an EL line head. In the laser recording which can record at high resolution in the main scanning direction, in a case in which images are recorded on the basis of image data having high resolution, a drawback relating to the present invention always arises. Further, in a case in which images are recorded on the basis of image data having low resolution, gradation images can be obtained by varying the resolution. Therefore, both cases are applicable to a laser recording.

Alternatively, the above-described embodiments are applicable to the case in which the recording is effected onto the intermediate medium other than multicolor prints. For example, the embodiments are applicable to the output device which has a lith film and a lithographic plate.

In the above-described embodiments, description was given about the image recording. However, the embodiments are applicable, for example, to a case of image reading which uses line image elements.

Description will be given hereinafter about recording means which relates to the recording means applicable to the present invention, improves the resolution in the main scanning direction, and can make the respective borderline regions between the recorded dots inconspicuous.

Figure 9A:
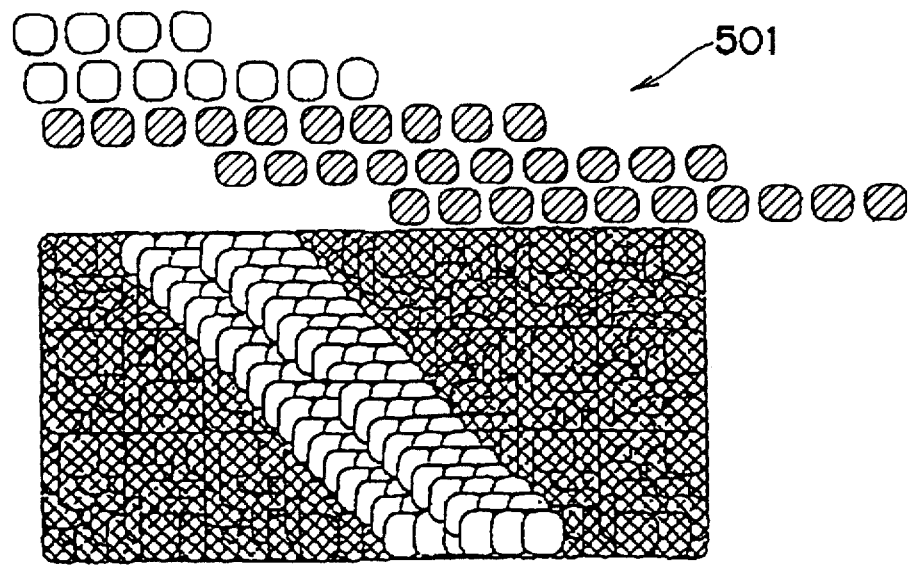
FIG. 9A is a pattern diagram for describing the recording means applicable to the present invention.

As shown in FIG. 9A, the head 501 which is arranged in the main scanning direction is conveyed half pitch in the sub-scanning direction so that the borderline regions are not conspicuous. The head 501 is moved a predetermined width in the main scanning direction so as to improve the resolution in the main scanning direction.

In the present embodiment, the resolution in the main scanning direction is tripled by moving the head one thirds of the unit of a pixel in the main scanning direction. Further, end portions of the respective heads are prevented from being located on the same line at the time of multiple movements by adding n, which is set at random or to a predetermined value, to ⅓ and by moving the head (n+⅓) unit of pixel in the main scanning direction.

Figure 9B:
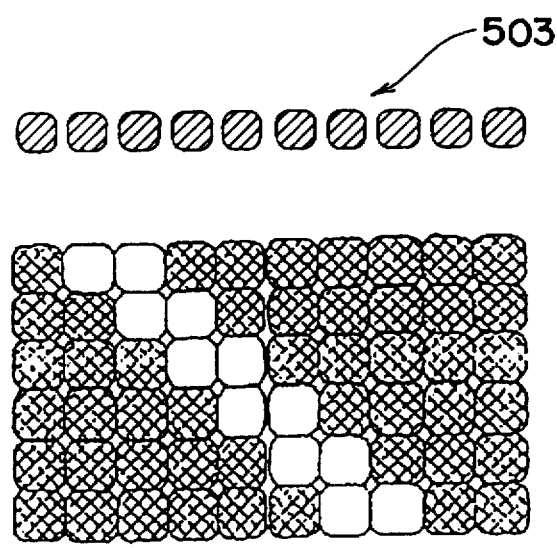
FIG. 9B is a pattern diagram for describing the recording means applicable to the present invention.

As a comparative example, FIG. 9B illustrates an inclined pattern which is recorded by a conventional means in which a head 503, which plural recording elements are arranged in the main scanning direction, is conveyed in the sub-scanning direction.

Figure 10:
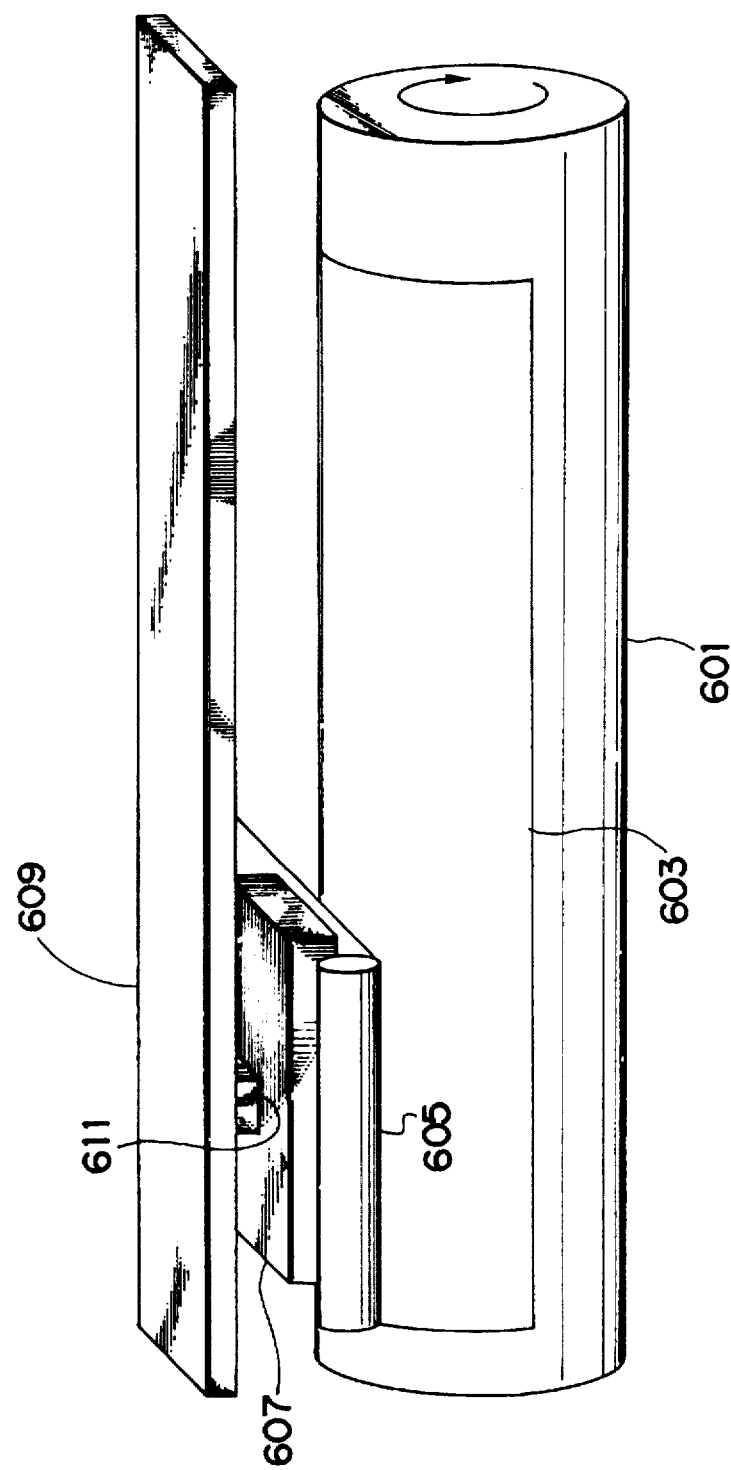
FIG. 10 is a schematic structural view for implementing the recording method described in FIG. 9.

FIG. 10 shows a recording device for implementing the above-described method. The device comprises a platen 601, an image receiving sheet 603 which is trained around the platen 601, an ink sheet 605 which includes ink transferred onto the image receiving sheet 603, a head 607 which transfers ink of the ink sheet 605 onto the image receiving sheet 603 and a ball screw moving rail 609 which includes a linear encoder which moves the head 607 in the main scanning direction. The head 607 and the moving rail 609 are connected by a raising and lowering mechanism 611 which can raise and lower the head 607.

Figure 11:
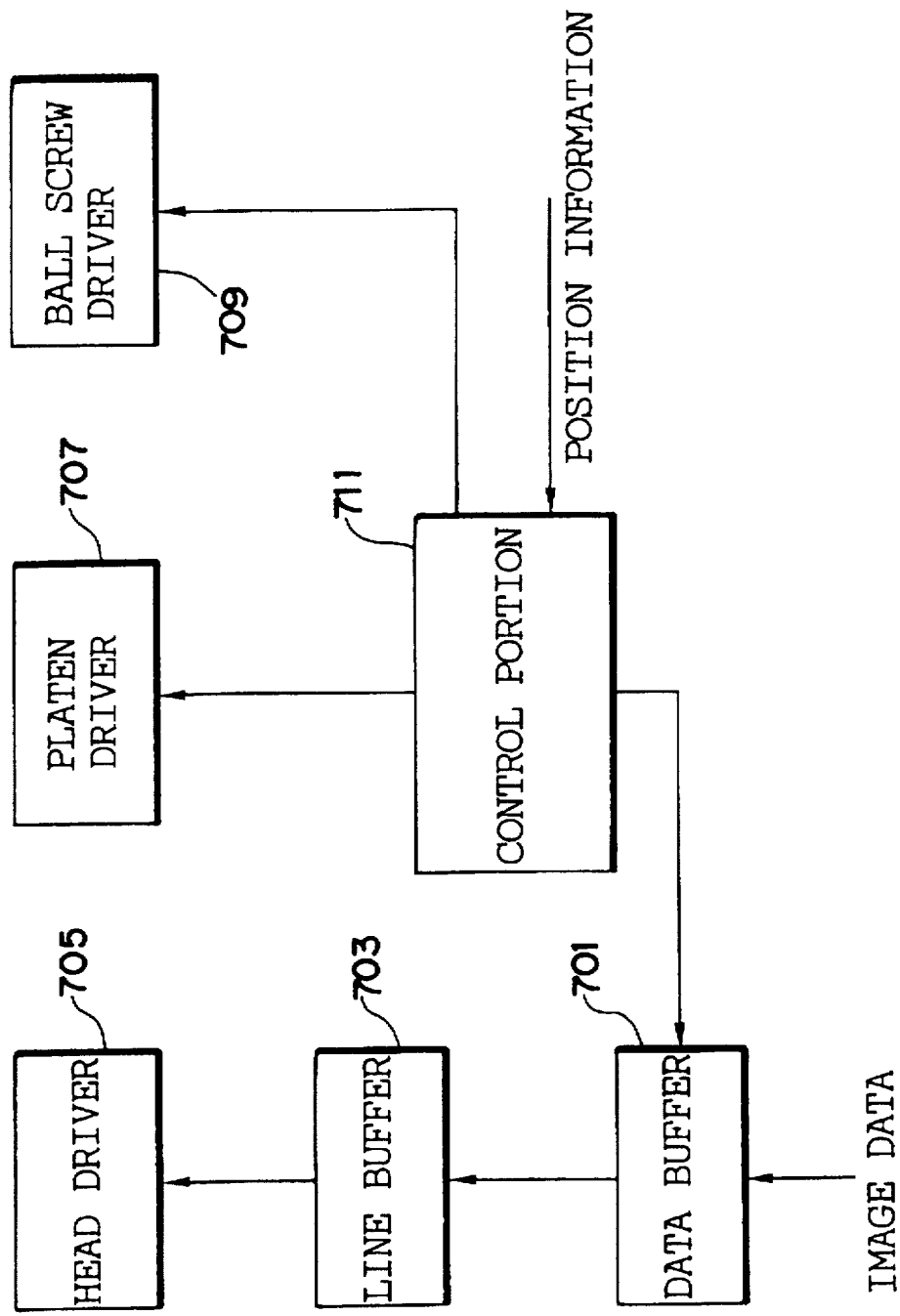
FIG. 11 is a block diagram for driving and controlling the device shown in FIG. 10.

FIG. 11 shows a block diagram which drives and controls the above-described device. Namely, image data having one cycle of platen and three units of pixels is stored and retained in a data buffer 701, and then one line of image data having three units of pixels is transmitted to a line buffer 703. The image data which was stored and retained at a line buffer 703 is supplied to a head driver 705, and the head driver 705 drives the head on the basis of the image data.

When recording of one line of image data set by three units of pixels has finished, a control portion 711 drives a platen driver 707. Accordingly, the platen is rotated and driven one line. Further, one line of image data having three units of pixels is transmitted from the data buffer 701 to the line buffer 703.

When one cycle of image recording has finished by a repetition of the above-described steps, the control portion 711 drives a ball screw driver 709. Accordingly, the head is moved (n+⅓) of pixel in the main scanning direction. By repeating the above-described steps, one cycle of image recording is further effected at a moved position.

The ball screw driver 709 controls the amount of movement of the head on the basis of the position information from the linear encoder, which is provided at the ball screw moving rail.

In the present embodiment, the head is moved while the resolution in the main scanning direction is 300 dpi and the precision is 5 μm.

The resolution in the main scanning direction can be further improved by setting the moving pitch of the head in the main scanning direction to one fourths or one fifths of pixels.

The above-described embodiments are applicable to a direct color thermally-sensitive recording, a fusing transfer thermally-sensitive recording and a sublimated transfer thermally-sensitive recording which are recorded by a thermal head. In addition, the embodiments are applicable to electrophotography, silver photography and photopolymer multicolor photosensitive material which are recorded by a liquid crystal alley line head. Moreover, the embodiments are applicable to electrophotography and silver photography which are recorded by an LED line head or an EL line head. In a case of laser recording, recording having high resolution can be effected in the main scanning direction. However, in order to not make the borderline regions conspicuous, the above-described means is applied to the laser recording. Further, the embodiments are applicable to the case in which the recording is effected onto an intermediate medium other than the multicolor prints. For example, the embodiments are applicable to the output device which has a lith film and a lithographic plate.

Description will be given hereinafter about the means which relates to the recording means applicable to the present invention, and which makes the transferred ink dots uniform so as to provide the good image quality.

In a thermally fused transfer recording, in order to desirably transfer the ink dots onto the image receiving sheet, it is necessary to heat the ink sheet sufficiently so that the ink is heated to more than the fusing point. Heating of the ink sheet can be achieved by the head. However, the heating efficiency is poor if the ink sheet is heated only by the head.

Therefore, the ink sheet is heated to the requisite temperature in advance and then transfers the ink dots onto the image receiving sheet in this state.

Figure 12:
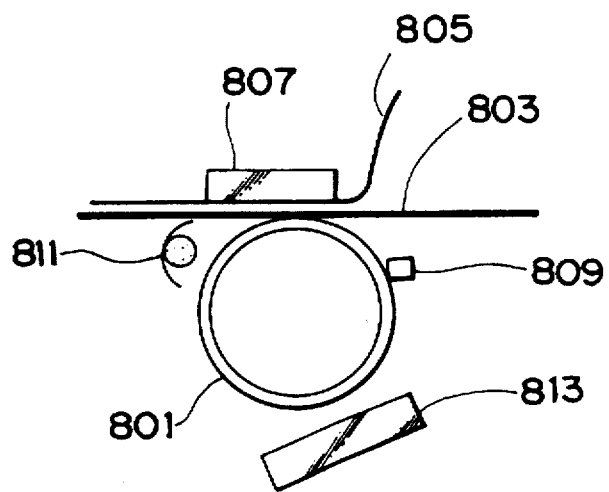
FIG. 12 is a schematic structural view for describing the recording means which is applicable to the present invention.

As shown in FIG. 12, in a structure which includes an image receiving sheet 803, which is conveyed by the rotation and driving of a platen roller 801 and a head 807, which supplies the requisite energy to an ink sheet 805, an infrared ray lamp 811 and a cooling fan 813 are operated on the basis of temperature detected by a temperature sensor 809, which is disposed in the vicinity of the platen roller 801. Accordingly, the surface temperature of the platen roller 801 is controlled.

Table 2 shows uniformities of the dot sizes when the was transferred onto the image receiving sheet in a state in which the respective color materials (Y, M, C and K) were heated to the requisite temperature (Embodiments), and uniformities of the dot sizes when the transfer was effected under the environment of 25° C. (Comparative Examples). Here, "Fusing Four Color A3 Super Ink Sheet CH 787" was used as a thermal ink sheet, and "White PET Film CH 895 for Fusing" was used as an image receiving sheet. Both products are manufactured by Seiko Instruments Inc.

TABLE 2

|   | Embodiments | | | Comparative Examples (Temperature of 25° C.) | |
|---|---|---|---|---|---|
|   | Temperature | Energy mJ/mm$^2$ | Dot Size Uniformity | Energy mJ/mm$^2$ | Dot Size Uniformity |
| Y | 50° C. | 30 | 5% | 45 | 10% |
| M | 45° C. | 30 | 5% | 40 | 10% |
| C | 50° C. | 30 | 5% | 45 | 10% |
| k | 45° C. | 30 | 5% | 40 | 10% |

As shown in Table 2, if the ink dots were transferred onto the image receiving sheet in a state in which the respective color materials were heated to the requisite temperature in advance, the uniformities of the dot sizes were improved at all of the color materials. Further, the recording energies supplied to the respective color materials were reduced.

The above-described effects can be obtained at the thermally-sensitive recording. Table 3 shows uniformities of dot sizes when the images were colored in a state in which the respective color materials (Y, M, C and K) were heated to the requisite temperature (Embodiments), and uniformities of dot sizes when the transfer was effected under the environment of 25° C. (Comparative Examples). Here, "Thermo Auto Chrome Paper FJX-TV P-20" manufactured by Fuji Photo Film Co., Ltd. was used as thermally-sensitive paper.

TABLE 3

|   | Embodiments | | | Comparative Examples (Temperature of 25° C.) | |
|---|---|---|---|---|---|
|   | Temperature | Energy mJ/mm$^2$ | Dot Size Uniformity | Energy mJ/mm$^2$ | Dot Size Uniformity |
| Y | 40° C. | 30 | 5% | 40 | 10% |
| M | 50° C. | 30 | 10% | 70 | 20% |
| C | 60° C. | 30 | 10% | 100 | 30% |

Figure 13:
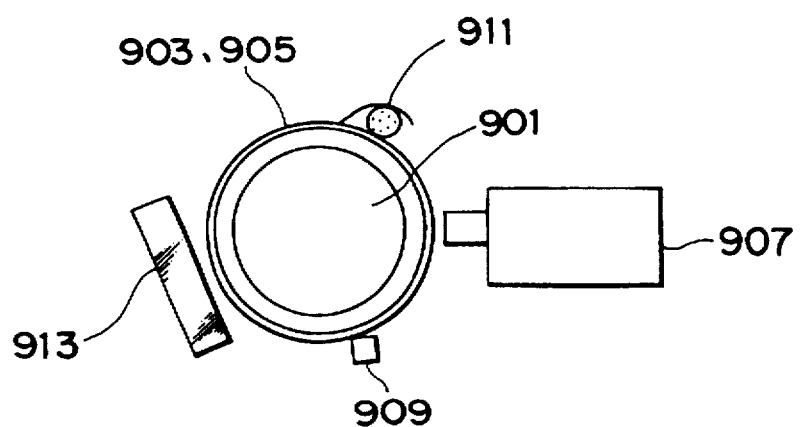
FIG. 13 is a schematic structural view for describing the recording means which is applicable to the present invention.

FIG. 13 shows a thermal recording effected by a laser head. In a structure which includes an image receiving sheet (or thermally-sensitive paper) 903, which is trained around a drum 901, and a laser head 907, which supplies the requisite energy to an ink sheet 905 superposed on the image receiving sheet 903, an infrared heater 911 and a cooling fan 913 are operated on the basis of temperature detected by a temperature sensor 909, which is disposed in the vicinity of the drum 901. The surface temperature of the drum 901 is thereby controlled.

The respective embodiments shown in FIGS. 12 and 13 are applicable to the case in which the recording is effected onto the intermediate medium other than the multicolor prints. For example, the embodiments can be applied to the output device which has a lith film and a lithographic plate.

What is claimed is:

1. An image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, said method comprising the step of:

recording the respective colors in a pattern in which a sub-scanning direction dot pitch was randomly arranged only in the sub-scanning direction.

2. An image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, said method comprising the step of:

recording one color in a pattern in which a dot pitch was ordinarily arranged in the sub-scanning direction, and recording the other colors in a pattern in which the dot pitch was randomly arranged only in the sub-scanning direction.

3. An image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, said method comprising the step of:

recording one color in an ordinarily arranged pattern, and recording at least two colors in patterns in which the length of pixel in the sub-scanning direction, is set to a different non-integer multiple with respect to the corresponding length of pixel of said one color.

4. An image recording method in which a head, in which a plurality of recording elements are arranged in the main scanning direction, is moved in the sub-scanning direction, one of densities and area rates of respective pixels being varied in accordance with image densities, respective colors of yellow, magenta, cyan and black being combined so as to record multicolor images, said method comprising the step of:

recording yellow in a pattern which was randomly arranged in the sub-scanning direction, and recording magenta, cyan and black in patterns in which the length of pixel in the sub-scanning direction, is set to a different non-integer multiple with respect to one another and with respect to yellow.

* * * * *